United States Patent
Patil et al.

(10) Patent No.: US 10,270,861 B2
(45) Date of Patent: Apr. 23, 2019

(54) METHOD AND SYSTEM FOR DUAL ROLE HANDLING IN A WIRELESS ENVIRONMENT

(71) Applicant: Samsung Electronics Co., Ltd., Gyeonggi-do (KR)

(72) Inventors: Mayuresh Madhukar Patil, Bangalore (IN); Venkateswar Jeedigunta, Bangalore (IN); Jong-Hyo Lee, Gyeonggi-do (KR); Karthik Srinivasa Gopalan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 93 days.

(21) Appl. No.: 14/913,571

(22) PCT Filed: Aug. 20, 2014

(86) PCT No.: PCT/KR2014/007733
§ 371 (c)(1),
(2) Date: Feb. 22, 2016

(87) PCT Pub. No.: WO2015/026158
PCT Pub. Date: Feb. 26, 2015

(65) Prior Publication Data
US 2016/0205199 A1    Jul. 14, 2016

(30) Foreign Application Priority Data

Aug. 20, 2013 (IN) .................... 3686/CHE/2013 PS
Jun. 6, 2014 (IN) .................... 3686/CHE/2013 CS (51) Int. Cl.
*H04W 28/18* (2009.01)
*H04L 29/08* (2006.01)
(Continued)

(52) U.S. Cl.
CPC ............ *H04L 67/141* (2013.01); *H04L 41/12* (2013.01); *H04W 28/18* (2013.01); *H04W 76/14* (2018.02); *H04L 69/329* (2013.01); *H04W 84/20* (2013.01)

(58) Field of Classification Search
None
See application file for complete search history.

(56) References Cited

U.S. PATENT DOCUMENTS 8,335,892 B1 * 12/2012 Minkin ............... G06F 12/0857
710/6
9,037,763 B2 * 5/2015 Huang .................. G06F 13/385
709/230
(Continued)

FOREIGN PATENT DOCUMENTS

| CN | 102474704 | 5/2012 |
| CN | 102948178 | 2/2013 |

OTHER PUBLICATIONS

PCT/ISA/210 Search Report issued on PCT/KR2014/007733 (pp. 3).
(Continued)

*Primary Examiner* — Joshua Joo
(74) *Attorney, Agent, or Firm* — The Farrell Law Firm, P.C.

(57) ABSTRACT

The various embodiments herein provide a method and system for dual role handling between at least two devices in a wireless environment. The method comprises seeking, by a first device, at least one device with a specified connection topology, establishing a connection with a second device having a same connection topology, establishing an Application service platform (ASP) session with the second device once the connection is established between the first device and the second device, sending, by the first device, a role negotiation message comprising a request for
(Continued)

role change to the second device, wherein the role negotiation message corresponds to a WSB message, receiving a custom message for confirmation, if the second device accepts the role change, and changing the connection topology between the first device and the second device once the role negotiation between the first device and the second device is completed.

14 Claims, 10 Drawing Sheets

(51) Int. Cl.
*H04L 12/24* (2006.01)
*H04W 76/14* (2018.01)
*H04W 84/20* (2009.01)

(56) References Cited

U.S. PATENT DOCUMENTS

| | | | | |
|---|---|---|---|---|
| 9,131,353 | B2* | 9/2015 | Qi | H04W 4/08 |
| 9,167,615 | B2* | 10/2015 | Lee | H04W 76/023 |
| 10,028,322 | B2* | 7/2018 | Qi | H04W 76/18 |
| 2007/0086401 | A1* | 4/2007 | Hong | H04W 72/0406 |
| | | | | 370/338 |
| 2008/0120408 | A1 | 5/2008 | Kim | |
| 2010/0077105 | A1* | 3/2010 | Chung | H04W 84/20 |
| | | | | 710/5 |
| 2011/0026504 | A1 | 2/2011 | Feinberg | |
| 2011/0099311 | A1* | 4/2011 | Kimura | G06F 13/4295 |
| | | | | 710/110 |
| 2011/0188391 | A1 | 8/2011 | Sella et al. | |
| 2011/0294474 | A1 | 12/2011 | Barany et al. | |
| 2012/0134349 | A1 | 5/2012 | Jung et al. | |
| 2013/0170482 | A1 | 7/2013 | Jung | |
| 2014/0334464 | A1* | 11/2014 | Qi | H04W 4/08 |
| | | | | 370/338 |
| 2014/0351321 | A1* | 11/2014 | Harper | G06F 21/10 |
| | | | | 709/203 |
| 2014/0351445 | A1* | 11/2014 | Davidson | H04L 65/1069 |
| | | | | 709/227 |

OTHER PUBLICATIONS

PCT/ISA/237 Written Opinion issued on PCT/KR2014/007733 (pp. 7).
Chinese Office Action dated Jun. 11, 2018 issued in counterpart application No. 201480057627.9, 15 pages.

* cited by examiner

Custom message format:
RNM: Role Negotiation Message

| Field | Size (octets) | Value | Description |
|---|---|---|---|
| Opcode | 1 | 7 | Custom message to be carried over ASP service |
| Sequence number | 1 | | Sequence number |
| Length | 2 | 1 | 1 byte for RNM |
| Payload | Variable | | 1 byte for RNM message<br>0x00 - Request to be Host device<br>0x01 - Request to be Device Role |

METHOD AND SYSTEM FOR DUAL ROLE HANDLING IN A WIRELESS ENVIRONMENT

PRIORITY

This application is a National Phase Entry of PCT International Application No. PCT/KR2014/007733, which was filed on Aug. 20, 2014, and claims priority to Indian Provisional Patent Application No. 3686/CHE/2013, which was filed on Aug. 20, 2013, and Indian Complete Patent Application No. 3686/CHE/2013, which was filed on Jun. 6, 2014, the contents of each of which are incorporated herein by reference.

TECHNICAL FIELD

The embodiments herein generally relate to wireless communication systems and more particularly relates to a method and system for dual role handling during a USB connection set up in a wireless environment.

BACKGROUND ART

Wireless Serial Bus is a Protocol Abstraction Layer (PAL) entity for running USB over Wi-Fi and also handles the Wi-Fi related aspects of creating a USB connection like discovery of USB devices managing power and management of the connection. Media Agnostic USB (MA-USB) is an entity that defines support to all USB transfer types like Bulk, interrupt, isochronous and control transfers and enumeration of USB devices. This is media agnostic and relies on medium specific PAL like Wireless Serial Bus (WSB) for setting up and handling of an underlying medium connectivity. Both the WSB and the MA-USB layers support client and host roles. Application Service Protocol (ASP) is a protocol that provides a framework for initiating and controlling a Wi-Fi direct Peer-to-Peer (P2P) connection. The ASP supports deployment of services on a wireless medium. The WSB can be deployed as a service on the ASP.

The primary steps involved in establishing a USB session over the wireless medium are as follows. The WSB entity initiates a search for the peer WSB entity that may be the WSB host or client function. The underlying ASP layer initiates a discovery process. Once a counterpart entity has been discovered and if needed, pre association service discovery has been performed, the association and wireless connection between the two devices is established. Once this is done, the enumeration of the client device by the host device is performed by the MA USB host layer. This is followed by the configuration of the endpoints on the device that enables the device to be ready for data transfer.

Figure 1:
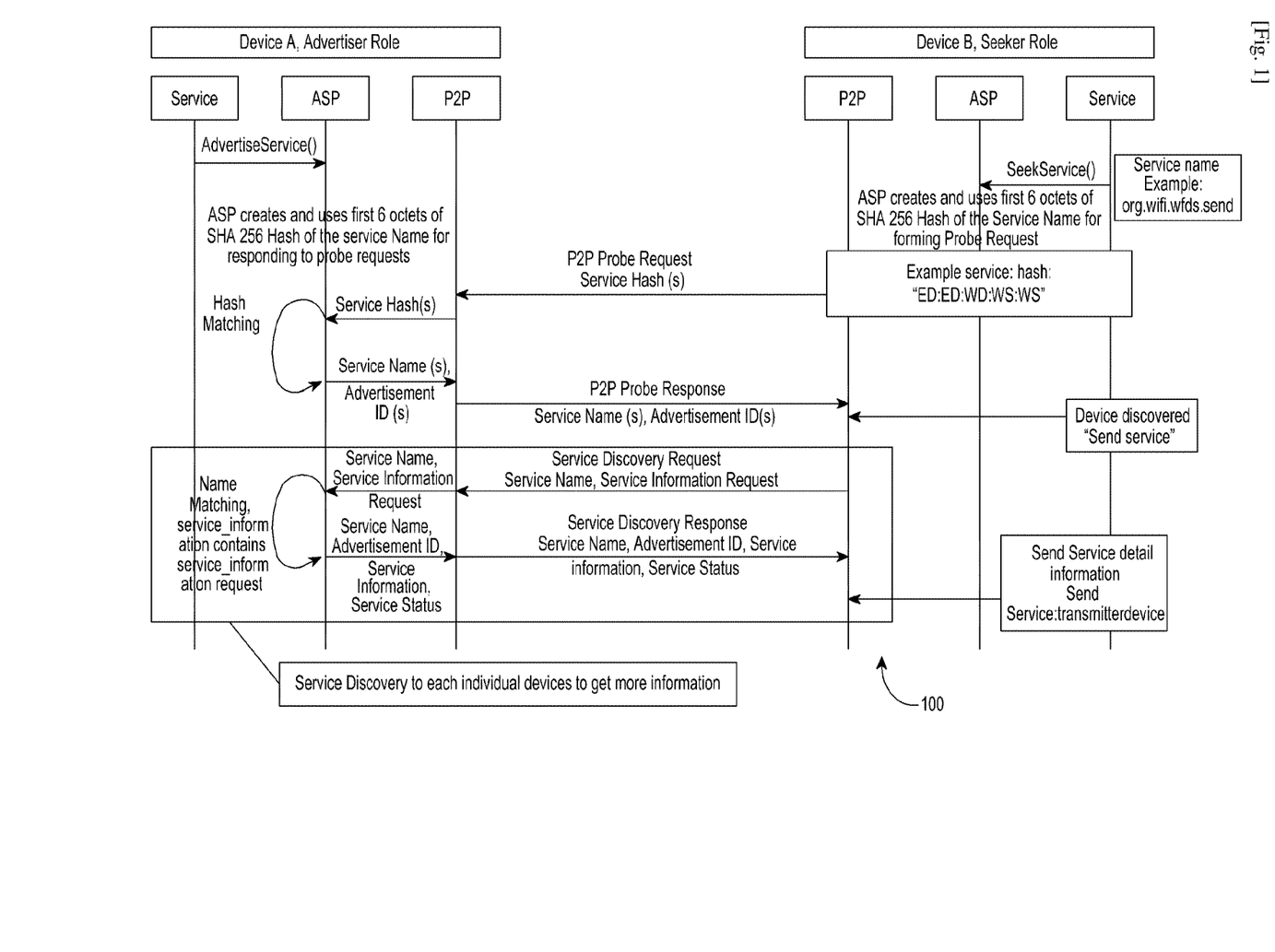
FIG. 1 is a signal flow diagram describing a process of discovering multiple devices while establishing a USB connection, according to a prior art illustration.

FIG. 1 describes process of discovering multiple devices, according to prior art. As described in the FIG. 1, individual service advertises itself to ASP (using the AdvertiseService primitive) with the full reverse DNS service name. Service can seek a service using the SeekService primitive which include the requested service name to be search on the air, which trigger the Probe Request message which include the service hash attribute. The ASP calculates the service hash for the service name using the 256 SHA 1 algorithms. Only first 6 bytes will be sent over the air in the Probe Request. When the recipient device receives Probe Request, matches the received hash with the registered services. Once the service hash is matched Probe Response is sent to the seeker device. The Probe Response includes the matched full service name. Once seeker receives the probe response where the device discovery completes and seeker device identifies the device and supported service. The seeker needs to do service discovery with the all the searched devices in order to find out the detail information about the service. The Seeker sends the Service discovery GAS request to request the details of the service, the Advertiser device reply with GAS response. The GAS response includes the details of the services for e.g., for send service it is role of the devices transmitter or receiver, serviced version number etc. as per prior art, service discovery would be mandatory and it is to be done for all USB classes.

Current service developed over the USB assumes the particular role and then try USB connection with the other device. But when USB operates on wireless connections, it assumes underlying the Wi-Fi Direct connectivity. Wi-Fi Direct connection will be shared across all the services, and also multiple USB session might be going on, in such cases it is highly possible that the traditional role definition based on the service will not work properly. User might see some time service is able to connect to other device some time it is not able to connect because the assumed role is not able to support during the connection setup. This will lead to bad user experience.

The above information is presented as background information only to assist with an understanding of the present disclosure. No determination has been made, and no assertion is made, as to whether any of the above might be applicable as prior art with regard to the present disclosure.

DISCLOSURE OF INVENTION

Technical Problem

Aspects of the present disclosure at to address the above-mentioned problems and/or disadvantages and to provide at least the advantages described below. Accordingly, an aspect of the present disclosure is to provide a method and system for dual role handling when two devices are connected with support in a wireless environment.

Solution to Problem

The various embodiments herein provide a method and system for dual role handling between at least two devices in a wireless environment. The method comprises of seeking, by a first device, at least one device with a specified connection topology, establishing a connection with a second device having a same connection topology, establishing an Application service platform (ASP) session with the second device once the connection is established between the first device and the second device, sending by the first device a role negotiation message comprising a request for role change to the second device, wherein the role negotiation message corresponds to a WSB message, receiving a custom message for confirmation, if the second device accepts the role change and changing the connection topology between the first device and the second device once the role negotiation between the first device and the second device is completed.

According to an embodiment of the present invention, the first device is a host device.

According to an embodiment of the present invention, the second device is a client device.

According to an embodiment of the present invention, the specified connection topology is a USB class including at least one of an MTP or Mass storage.

According to an embodiment of the present invention, at least one of the first device and the second device is adapted to initiate the role negotiation message based on the connection topology.

The present invention further discloses a method for providing dual role handling between at least two devices in a wireless communication, according to another embodiment herein. The method comprises of seeking, by a first device, at least one device with a specified connection topology, establishing a connection with a second device having a same specified connection topology, establishing an Application Service Platform (ASP) session with the second device, sending, by the first device, a role negotiation message to the second device, wherein the role negotiation message comprises a request for a role change, receiving a custom message for confirmation, if the second device accepts the request for role change, and changing the connection topology between the first device and the second device once the role negotiation between the first device and the second device is completed.

According to this embodiment of the present invention, the first device is a client device and the second device is a host device.

According to this embodiment of the present invention, the specified connection topology is a USB class including at least one of an MTP or Mass storage.

According to another embodiment of the present invention, a method for providing dual role handling between at least two devices in a wireless communication comprises of identifying a first device with a specified connection topology, establishing, by the first device, a connection with a second device having a same connection topology, sending a PD request by an Application Service Platform (ASP), to the second device, receiving a PD response from the ASP associated with the second device, wherein the PD response includes a role defined for the first device, establishing an ASP session once the connection is established between the first device and the second device, and changing the connection topology between the first device and the second device once the role negotiation between the first device and the second device is completed.

According to this embodiment of the present invention, the PD request comprises a service role which is to be evented out by the ASP to WSB service (Wireless Serial Bus) at the second device.

According to this embodiment of the present invention, the service role is further defined by the connection topology.

According to an embodiment of the present invention, a method for providing dual role handling between at least two devices in a wireless communication comprises of identifying a first device with a specified connection topology, establishing, by the first device, a connection with a second device having a same connection topology, sending a PD request by an ASP, to the second device, receiving a PD response from the ASP associated with the second device, wherein the PD response includes deferred status indicating follow on PD request or response, sending a PD request by the ASP, to first device which includes a service role information, sending a PD response by the ASP, to second device which confirms the service role, establishing an ASP session once the connection is established between the first device and the second device, and establishing the connection topology between the first device and the second device once the role negotiation between the first device and the second device is completed.

According to an embodiment of the present invention, the follow on PD request comprises a service role which is to be evented out by the ASP to WSB service (Wireless Serial Bus) at the first device.

According to an embodiment of the present invention, the service role is further defined by the connection topology.

Embodiments herein also provide a system for providing dual role handling between at least two devices in a wireless communication. The system comprises a role negotiation control module adapted for seeking, by a first device, at least one device with a specified connection topology, wherein the first device is a host device, establishing a connection with a second device having a same connection topology, wherein the second device is a client device, establishing an Application service platform (ASP) session with the second device once the connection is established between the first device and the second device, changing the connection topology between the first device and the second device once the role negotiation between the first device and the second device is completed, and a wireless device discovery module adapted for: sending, by the first device, a role negotiation message comprising a request for role change to the second device, wherein the role negotiation message corresponds to a WSB message, and receiving a custom message for confirmation, if the second device accepts the role change.

According to an embodiment of the present invention, the system further comprises of the role negotiation module is adapted for seeking, by a first device, at least one device with a specified connection topology, wherein the first device is a client device, establishing a connection with a second device having a same specified connection topology, wherein the second device is a host device, establishing an Application Service Platform (ASP) session with the second device, and changing the connection topology between the first device and the second device once the role negotiation between the first device and the second device is completed.

According to an embodiment of the present invention, the system further comprises of the wireless device discovery module adapted for sending, by the first device, a role negotiation message to the second device, wherein the role negotiation message comprises a request for a role change, and receiving a custom message for confirmation, if the second device accepts the request for role change.

According to an embodiment of the present invention, adapted for the role negotiation control module is further adapted for identifying a first device with a specified connection topology, establishing, by the first device, a connection with a second device having a same connection topology, establishing an ASP session once the connection is established between the first device and the second device, and changing the connection topology between the first device and the second device once the role negotiation between the first device and the second device is completed.

According to an embodiment of the present invention, the wireless device discovery module is configured for sending a PD request by an Application Service Platform (ASP), to the second device, and receiving a PD response from the ASP associated with the second device, wherein the PD response includes a role defined for the first device.

According to an embodiment of the present invention, the PD request comprises a service role which is to be evented out by the ASP to WSB service (Wireless Serial Bus) at the second device.

According to an embodiment of the present invention, the role negotiation control module is adapted for: identifying a first device with a specified connection topology, establishing, by the first device, a connection with a second device having a same connection topology, establishing an ASP session once the connection is established between the first device and the second device, and establishing the connection topology between the first device and the second device once the role negotiation between the first device and the second device is completed.

According to an embodiment of the present invention, the wireless device discovery module is adapted for sending a PD request by an ASP, to the second device, receiving a PD response from the ASP associated with the second device, wherein the PD response includes deferred status indicating follow on PD request or response, sending a PD request by the ASP, to first device which includes a service role information, and sending a PD response by the ASP, to second device which confirms the service role.

According to an embodiment of the present invention, the follow on PD request comprises a service role which is to be evented out by the ASP to WSB service (Wireless Serial Bus) at the first device.

According to an embodiment of the present invention, the service role is further defined by the connection topology.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF DRAWINGS

The other objects, features and advantages will occur to those skilled in the art from the following description of the preferred embodiment and the accompanying drawings in which.

Although specific features of the present invention are shown in some drawings and not in others, this is done for convenience only as each feature may be combined with any or all of the other features in accordance with the present invention.

MODE FOR THE INVENTION

The present invention provides a method and system for dual role handling between at least two devices in a wireless environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The present invention provides three methods for dual role handling between at least two devices in a wireless environment. The first approach is to send new messages over an ASP session. The new messages has message format defined in the ASP coordination function. The second approach is to directly send the new messages from the WSB service entity over layer 2 by defining a new SNAP header. The new message sent over 2 has a new SNAP protocol identification header. The ASP role negotiation messages are encapsulated using a SNAP header with the first three bytes set to the WFA specific OUI value: 0x50 6F 9A, the fourth byte set to the role negotiation specific OUI Type value: 0xff, and the fifth byte set to 0x00. The third approach is to send a number of bits in a PD request/PD response.

Figure 2:
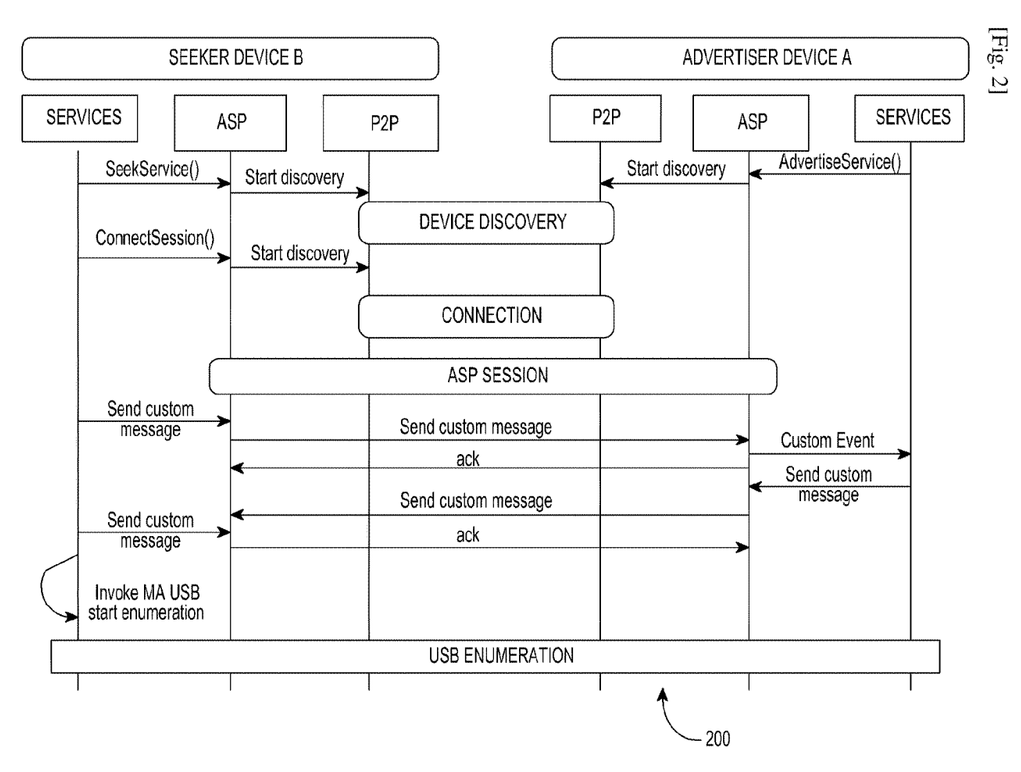
FIG. 2 is a signal flow diagram illustrating an exemplary method for dual role handling between at least two devices during an ASP session, according to an embodiment of the present invention.

FIG. 2 is a signal flow diagram illustrating an exemplary method for dual role handling between at least two devices during an ASP session, according to an embodiment of the present invention. According to this embodiment, a new custom message is defined in the ASP coordination protocol. This new custom message is used to carry service information. Further, the new custom message is used to carry the role negotiation request and response. In FIG. 2, device A acts as a service advertiser and device B acts as a service seeker. In device A, a service process advertises a service(s) to an ASP by an AdvertiseService command so that another device, for example, device B may discover an ASP session related to the advertised service(s) and be initialized. When an application is executed and a service use command is generated to transmit a specific file in device B, a service process of device B transmits a SeekService command seeking the device A with particular USB class, e.g., MTP or Mass storage by invoking the Seek Service( ) primitive. According to this embodiment, the seeking device B is considered to take any role for example, a Host role. Once the discovery is completed, seeking device B starts connecting to remote device by invoking ConnectSession( ) primitive. Upon receiving the ConnectSession( ) primitive, the ASP of device B tries to establish the connection using current WFDS approach. Once the connection is established between the seeker device B and the remote device such as device A, an ASP session is initiated. Once the ASP session is initiated, the service of the seeker device B get an event from the ASP about the ASP Session establishment, but due to connection topology, any device can request for a role negotiation procedures. In this case, seeking device B would change his role from host to client. Hence, the service of the seeking device B sends a role negotiation message in a newly defined custom message of ASP to the device A. The new custom message includes the requested role, for example, as a client. After receiving the new custom message, the device A sends the acknowledgement message to this request and sends the event to the WSB service. If the WSB service on the device A is accepted for the role change, then the service of the device A sends a custom message for confirmation which carries the device A's role, i.e. as a host. Once the role negotiation is completed, the protocol stack initiates the appropriate USB stack and interacts with the USB core to initiate the appropriate entities in the stack.

According to an embodiment of the present invention, the terminologies seeking device and the advertiser device represent the one of the first device and the second device, and have been used throughout the document interchangeably.

Figure 3:
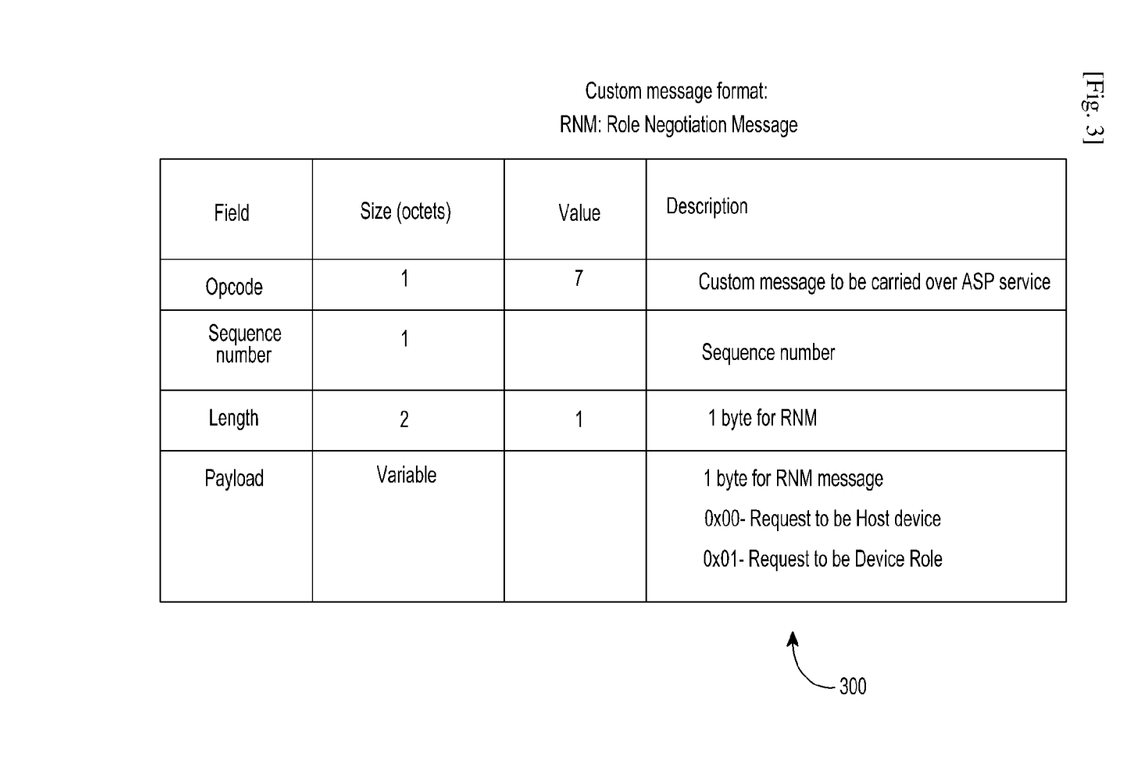
FIG. 3 is a tabular diagram of a custom message format for carrying the role negotiation request and response in the ASP session, according to an embodiment of the present invention.

FIG. 3 is a tabular diagram of a custom message format for carrying the role negotiation request and response in the ASP session, according to an embodiment of the present invention. According to FIG. 3, the custom message comprises of an opcode field of size 1 octet for carrying the custom message over ASP service. the custom message further comprises of a sequence number field of size 1 octets indicating the sequence number of the custom message, a length field of size 2 octets having 1 byte for role negotiation message and a payload filed having 1 byte for role negotiation message where 0x00 indicates that the message is a request to be a host device and 0x01 indicates that the message is a request to be a client device role.

Figure 4:
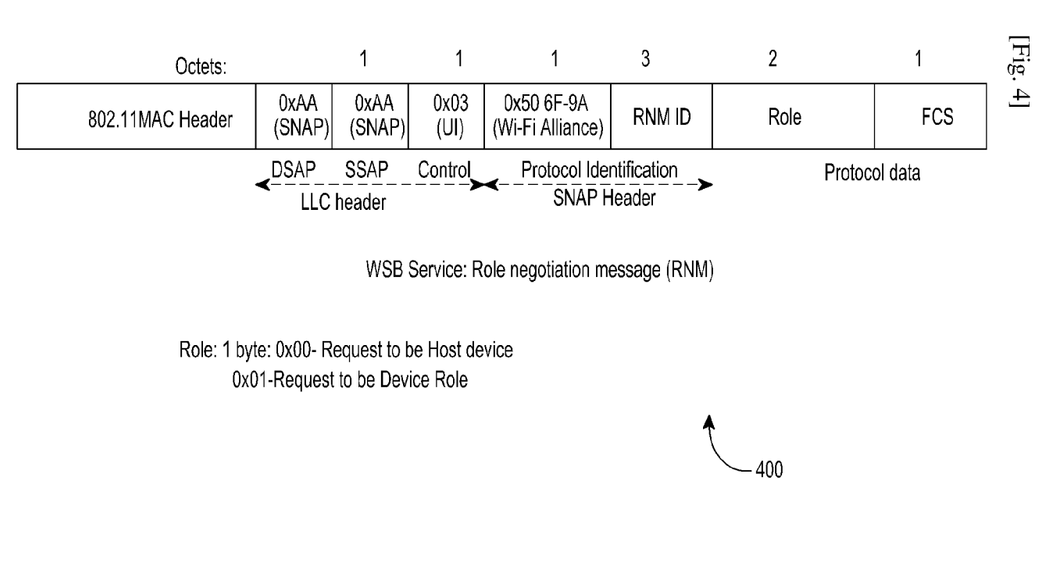
FIG. 4 illustrates format of a role negotiation message in WSB service, according to an embodiment of the present invention.

FIG. 4 illustrates format of a role negotiation message in WSB service, according to an embodiment of the present invention. According to an embodiment of the present invention, a new custom message is defined between WSB service entities. This new custom message is carried directly over MAC. Consider that device A acts as a service advertiser and device B acts as a service seeker. For a given service, device A is a receiving device and device B is a device. In device A, a service process advertises a service(s) to an ASP by an AdvertiseService command so that another device, for example, device B may discover an ASP session related to the advertised service(s) and be initialized. When an application is executed and a service use command is generated to transmit a specific file in device B, a service process of device B transmits a SeekService command seeking the device A with particular USB class, e.g., MTP or Mass storage by invoking the Seek Service( ) primitive. According to this embodiment, the seeking device B is considered to take any role for example, a Host role. Once the discovery is completed, seeking device B starts connecting to remote device by invoking ConnectSession( ) primitive. Upon receiving the ConnectSession( ) primitive, the ASP of device B tries to establish the connection using current WFDS approach. Once the connection is established between the seeker device B and the remote device such as device A, an ASP session is initiated. Once the ASP session is initiated, the service of the seeker device B is evented, but due to connection topology, any device can request for a role negotiation procedures. In this case, seeking device B would change his role from host to client. Hence, the service of the seeking device B sends a role negotiation message in a newly defined custom message of ASP which is carried directly over the MAC to the device A. The new custom message includes the requested role, for example, as a client. After receiving the new custom message, the device A sends the acknowledgement message to this request and sends the event to the WSB service. If the WSB service on the device A is accepted for the role change, then the service of the device A sends a custom message for confirmation which carries the device A's role, i.e. as a host. Once the role negotiation is completed, the protocol stack initiates the appropriate USB stack and interacts with the USB core to initiate the appropriate entities in the stack.

Figure 5:
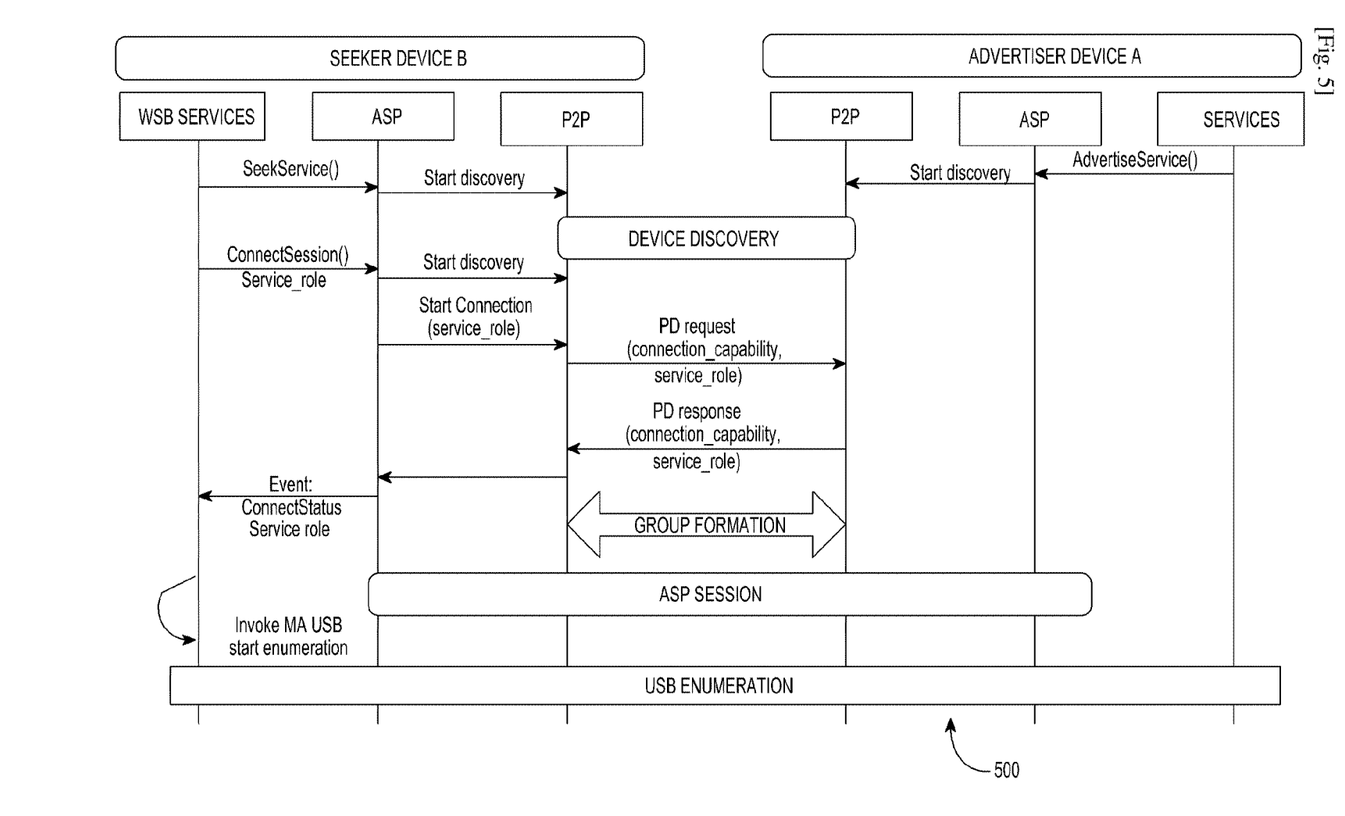
FIG. 5 is a signal flow diagram illustrating an exemplary an exemplary method for dual role handling between at least two devices during an ASP session, according to another embodiment of the present invention.

FIG. 5 is a flow diagram illustrating an exemplary an exemplary method for dual role handling between at least two devices during an ASP session, according to another embodiment of the present invention. According to this embodiment, PD request and response are utilized to carry service_role information. A new P2P attribute is defined which carries the service_role. In FIG. 5, only one round of PD request/response is shown, but it is possible to have two rounds of PD request/response as per the current WFDS mechanism. The ConnectionSession( ) primitive also requires a service_role input parameter. Also, in the event: ConnectStatus also can carry the service_role. In FIG. 5, device A acts as a service advertiser and device B acts as a service seeker. For a given service, device A is a receiving device and device B is a device. In device A, a service process advertises a service(s) to an ASP by an AdvertiseService command so that another device, for example, device B may discover an ASP session related to the advertised service(s) and be initialized. When an application is executed and a service use command is generated to transmit a specific file in device B, a service process of device B transmits a SeekService command seeking the device A with particular USB class, e.g., MTP or Mass storage by invoking the Seek Service( ) primitive. Once the discovery is completed, seeking device B starts connecting to remote device by invoking ConnectSession( ) primitive. Here, seeking device B mentions the service_role as a host or a client or any other role. Any device can wish to take up any role, and remote device can influence the role, or connection topology can influence the role. Upon receiving the ConnectSession( ) primitive, the ASP of device B tries to establish the connection using current WFDS approach. For establishing the connection, the ASP of device B sends a PD request to device A which includes the service_role that is evented out the WSB service on the remote side. Now, the remote side (i.e. at device A) the PD request is evaluated for its role and connection topology. It is also possible that the connection topology can influence the service role. The remote ASP (ASP of device A) replies with a PD response, which includes the service_role. The service_role is evented out to the WSB service on both sides, and then it continues the connection establishment process either using the GO negotiation procedures or using persistence group created earlier or by using autonomous group handling as per the WFDS specification. Once the connection is established, ASP session is established. Once the role negotiation is completed, the protocol stack initiates the appropriate USB stack and interacts with USB core to initiate the appropriate entities in the stack.

Figure 6:
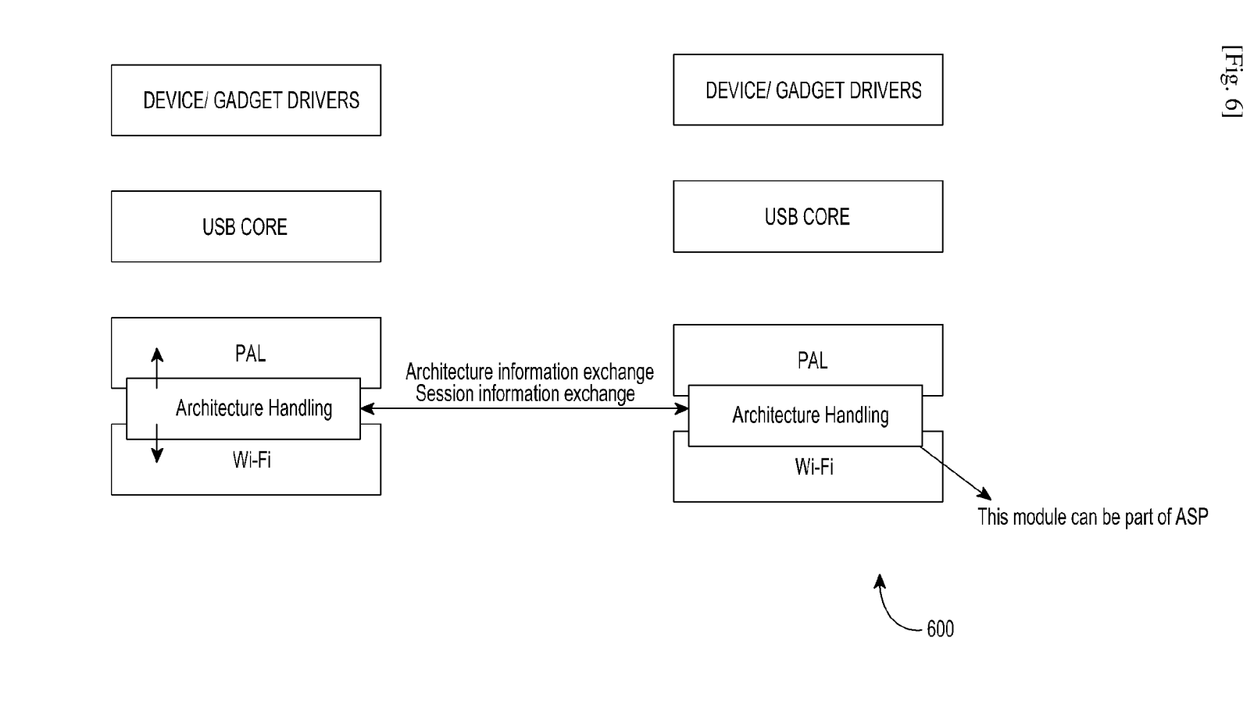
FIG. 6 is a block diagram illustrating changes made in the architecture handling module, according to an embodiment of the present invention.

FIG. 6 illustrates changes made in the architecture handling module, according to an embodiment of the present invention. In FIG. 6, the architecture handling module is adapted for starting a connection topology with USB topology and determining the roles of the devices. Further, the architecture handling module is adapted for dynamically changing the connection topology by re negotiating the roles between the different devices and changing the underlying topology of the connectivity. The main functions of the AH module include providing an interface to the service or applications to initiate the three box model USB connections, providing interface to PAL which can allow PAL to initiate the connection with pre defined PAL devices roles, providing underline topology handling for PAL connections, providing mechanism for exchanging session information e.g. ongoing transfer session between two devices, and determining the best roles based on the device classes or type during connections where the discovery information has dual mode support for the devices. The AH interfaces include PAL which is adapted for role initiating. The PAL determines which drivers to load, the device/gadget driver depending on the device role (host or accessory). Further, PAL provides session information to applications. In case of the three box model, device who initiates the USB session knows the session progress information. Also, PAL dynamically requests to change the role. At the Wi-Fi layer of the protocol architecture, a topology for connection establishment is created and formulated depending on the roles of the PAL. Further, Wi-Fi layer handles the discovery mechanisms.

Figure 7A:
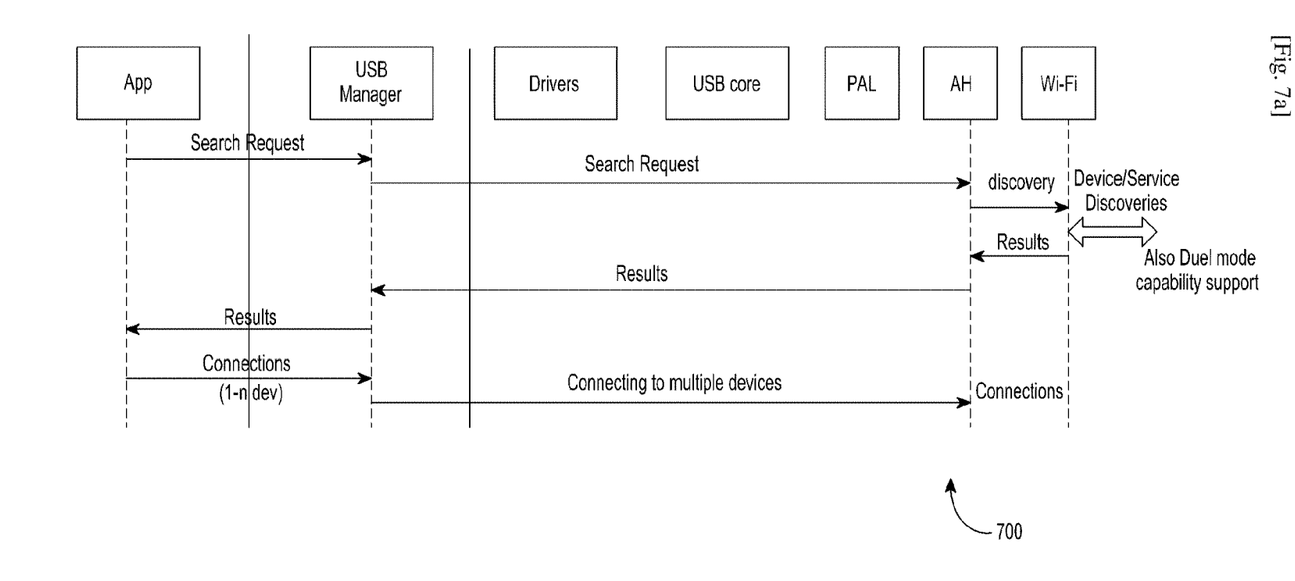
FIG. 7 is a flow diagram illustrating a process of implementing interface definition, according to an embodiment.
Figure 7B:
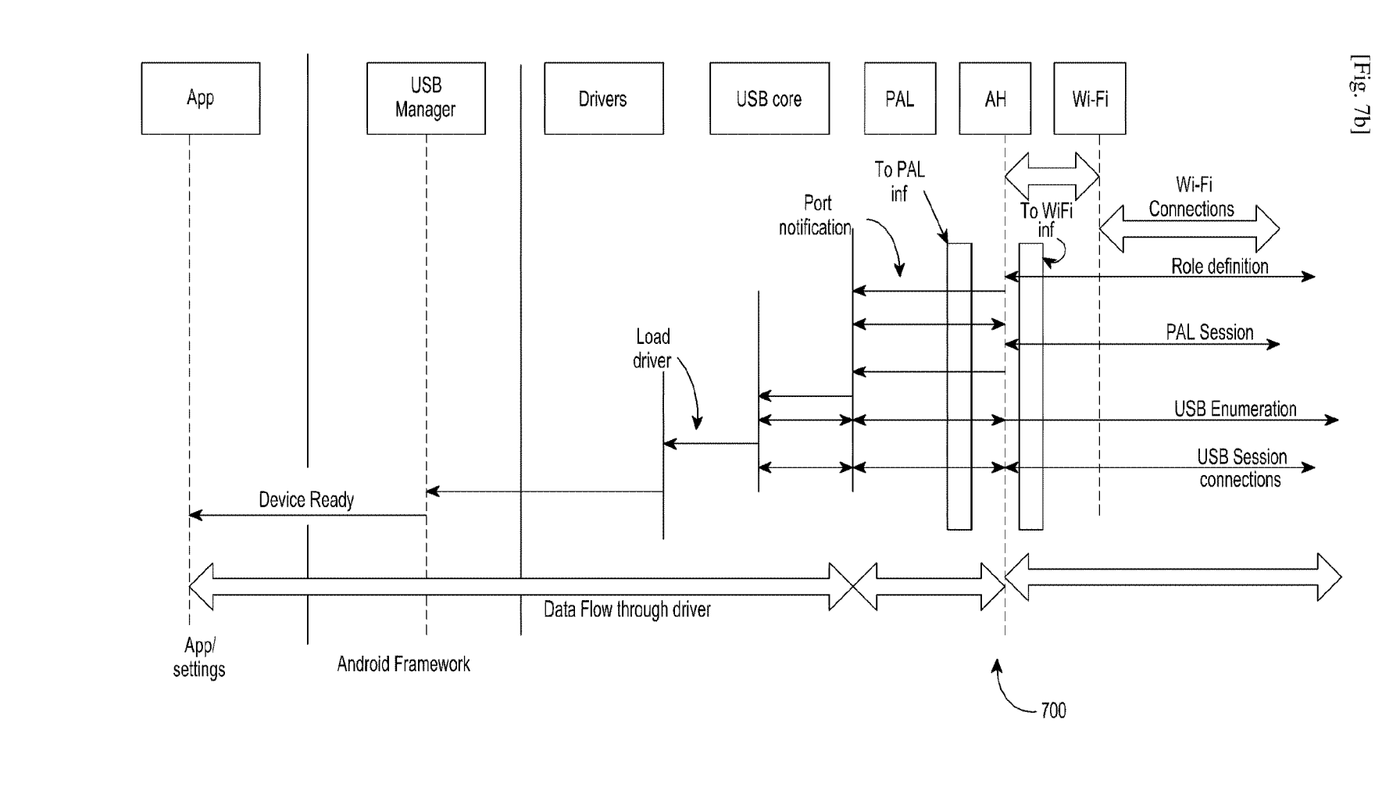

FIG. 7 (including FIG. 7a and FIG. 7b) is a flow diagram illustrating process of implementing interface definition, according to an embodiment.

This figure illustrates the software stack implementation specific handling of the sequence of events for handling of the dual role handling. The main entity is AH which acts as a interface layer between the Wi-Fi and USB PAL. AH have interfaces to USB Manager entity for starting the discovery procedures over Wi-Fi interface. AH uses the Wi-Fi layer to start the discovery procedures, and once discovery is successful it events out the discovered devices to USB Manager. Once USB Manager request for connection, it uses the Wi-Fi Layer to start the connection procedures. The AH also responsible for the role handling and negotiate the role with remote device. Once the role is finalized, then AH events the port status event indicating USB device connected indication to USB PAL Layer which triggers the normal USB procedures like enumerations and loading of the particular driver.

Figure 8:
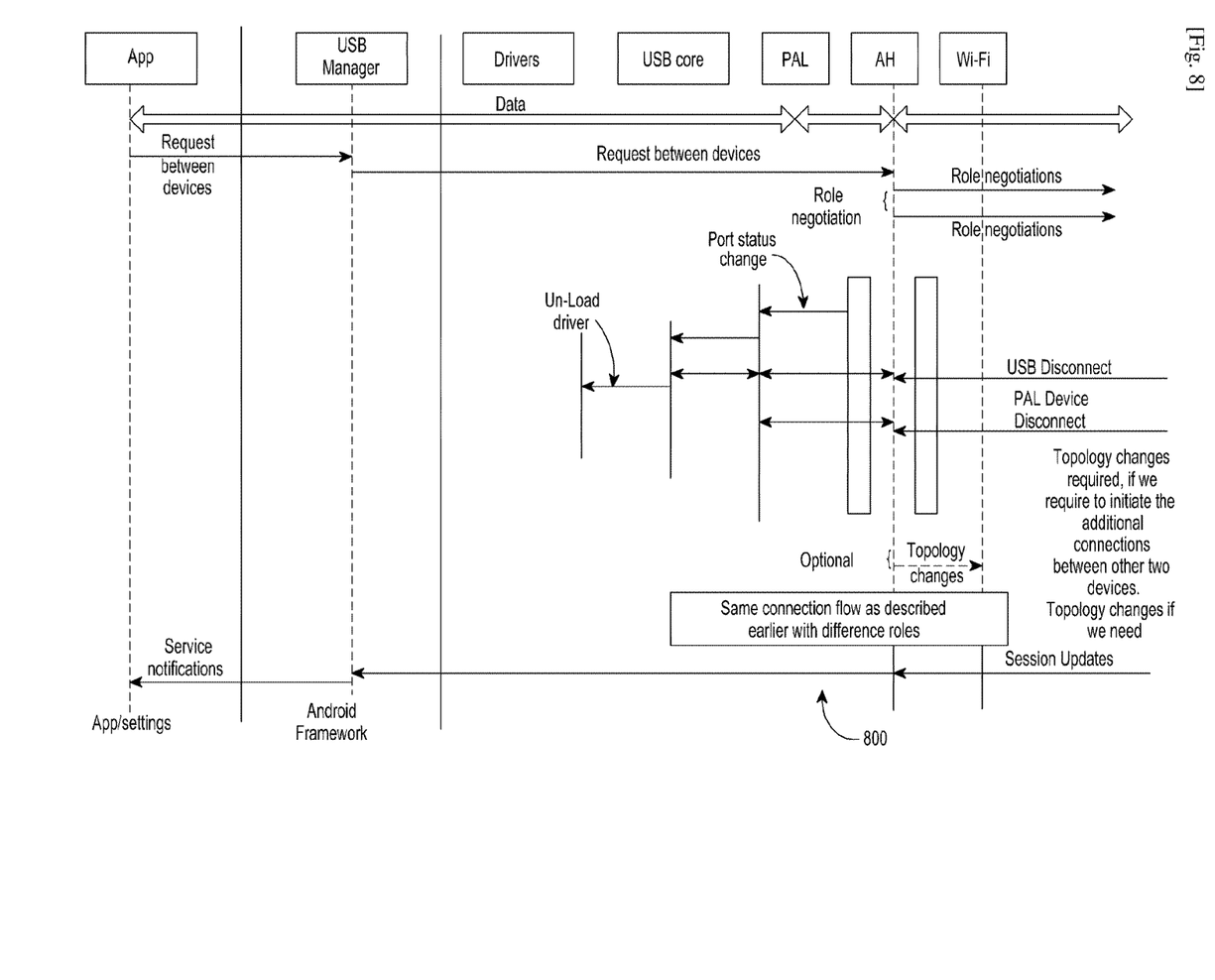
FIG. 8 is a flow diagram illustrating process of implementing interface definition for multiple devices, according to an embodiment.

FIG. 8 is a flow diagram illustrating process of implementing interface definition for multiple devices, according to an embodiment.

This figure illustrates the sequence of flow in the software stack view when role is changed when already USB connection is established. Here USB Manager again uses the AH and request for the role negotiation. The AH performs the role negotiation and which trigger the USB disconnect procedures and then it is possible that underlying Wi-Fi connection topology also needs to be changed, and once it is done it start the same connection flow as described in the FIG. 7.

Figure 9:
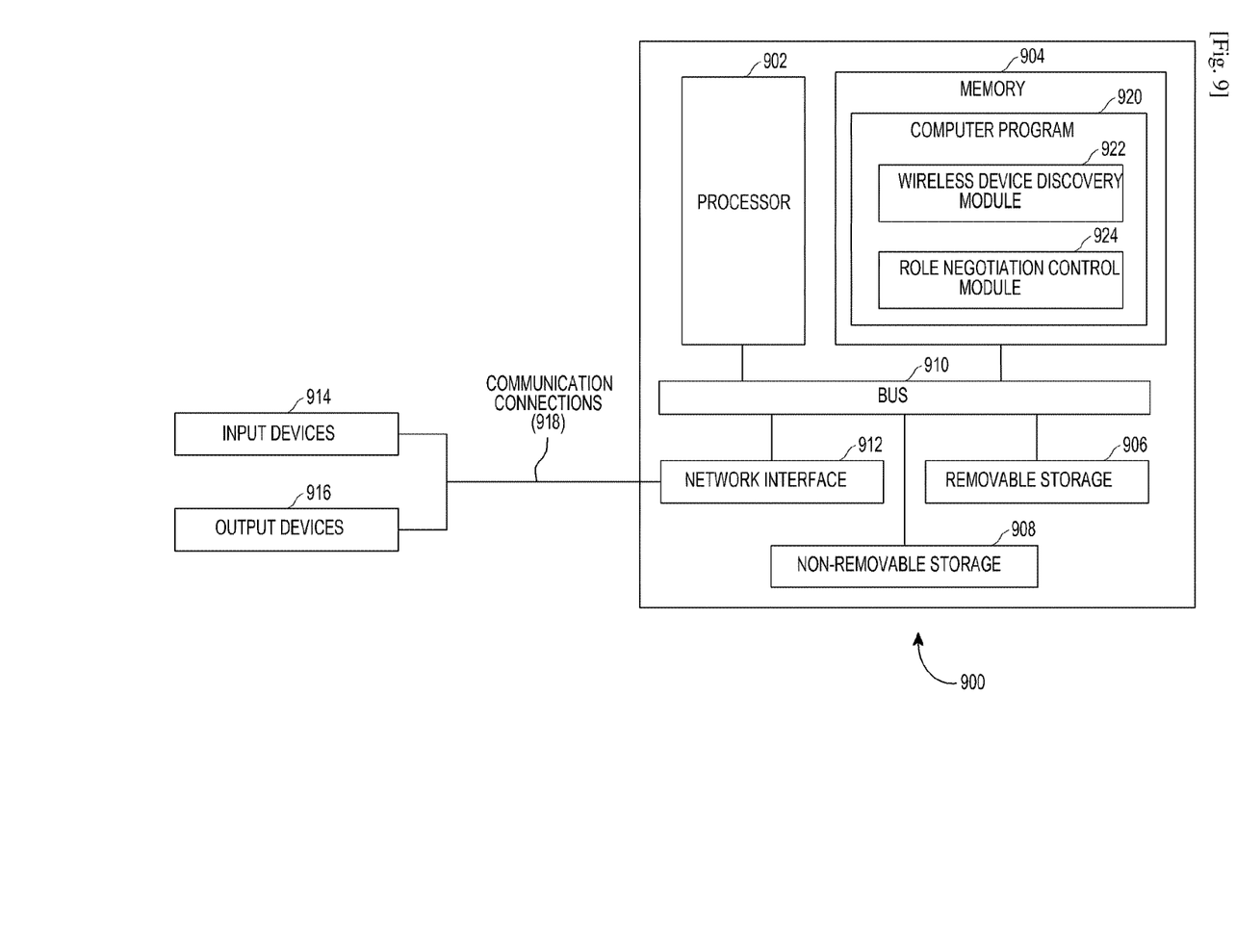
FIG. 9 is a block diagram of a system for dual role handling between at least two devices in a wireless environment, according to an embodiment of the present invention.

FIG. 9 is a block diagram of a system for dual role handling between at least two devices in a wireless environment, according to an embodiment of the present invention. FIG. 9 shows an example of a computing device for implementing one or more embodiments of the present subject matter.

The computing device 900 may include a processor 902, memory 904, a removable storage 906, and a non-removable storage 908. The computing device 900 additionally includes a bus 910 and a network interface 912. The computing device 900 may include or have access to one or more user input devices 914, one or more output devices 916, and one or more communication connections 918 such as a network interface card or a universal serial bus connection. The one or more user input devices 914 may be keyboard, mouse, and the like. The one or more output devices 916 may be a display. The communication connections 918 may include mobile networks such as General Packet Radio Service (GPRS), Wireless Fidelity (Wi-Fi®), Worldwide Interoperability for Microwave Access (Wi-Max), Long Term Evolution (LTE), and the like.

The memory 904 may include volatile memory and/or non-volatile memory for storing computer program 920. A variety of computer-readable storage media may be stored in and accessed from the memory elements of the computing device 900, the removable storage 906 and the non-removable storage 908. Computer memory elements may include any suitable memory device(s) for storing data and machine-readable instructions, such as read only memory, random access memory, erasable programmable read only memory, electrically erasable programmable read only memory, hard drive, removable media drive for handling memory cards and the like.

The processor 902, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 902 of the computing device 900. For example, a computer program 920 includes a wireless device discovery module 922 and a role negotiation control module 924 stored in the form of machine readable instructions. The machine-readable instructions, which when executed by the processor 902, may cause the computing device 900 to perform functionalities of the wireless device discovery module 922 and the role negotiation control module 924, according to the various embodiments of the present subject matter. In some embodiments, the processor 902 may perform the method steps illustrated in FIGS. 1-9 upon executing the computer program in the form of wireless device discovery module 922 and the role negotiation control module 924.

The wireless device discovery module 922 supports Internet Protocol (IP) based wireless communication for the Wi-Fi device and is adapted for transmitting and receiving various frames such as probe request frame, probe response frame, and so on. The role negotiation control module 924 is adapted for seeking, by a first device, at least one device with a specified connection topology, establishing a connection with a second device having a same connection topology, and establishing an Application service platform (ASP) session with the second device once the connection is established between the first device and the second device. The role negotiation control module 924 is further adapted for changing the connection topology between the first device and the second device once the role negotiation between the first device and the second device is completed.

Furthermore, the role negotiation control module 924 is adapted for identifying a first device with a specified connection topology, and establishing, by the first device, a connection with a second device having a same connection topology.

The present embodiments have been described with reference to specific example embodiments. It will be evident that various modifications and changes may be made to these embodiments without departing from the broader spirit and scope of the various embodiments. Furthermore, the various devices, modules, and the like described herein may be enabled and operated using hardware circuitry, firmware, and/or software embodied in a machine readable medium. Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A method for providing dual role handling between at least two devices in a wireless communication, the method comprising:
    seeking, by a first device, at least one device with a first connection topology;
    establishing a connection with a second device having the first connection topology;
    establishing an application service platform (ASP) session with the second device;
    sending, by the first device, a role negotiation message comprising a request for role change to the second device over the ASP session, wherein the role negotiation message corresponds to a user-defined ASP message;
    receiving a message for confirmation over the ASP session, if the second device accepts the request for role change based on the role negotiation message; and
    determining a second connection topology between the first device and the second device based on the role change between the first device and the second device.

2. The method of claim 1, wherein the first device is a client device and/or the second device is a host device.

3. The method of claim 1, wherein the first connection topology is a universal serial bus (USB) class including at least one of a media transfer protocol (MTP) or mass storage.

4. A method for providing dual role handling between at least two devices in a wireless communication, the method comprising:
    identifying a first device with a first connection topology;
    establishing, by the first device, a connection with a second device having the first connection topology;
    sending a request for role change by a first application service platform (ASP) of the first device, to the second device over the connection, wherein the request is a provision discovery (PD) request;
    receiving a response from a second ASP of the second device over the connection, wherein the response includes a role defined for the first device, wherein the response is a PD response;
    establishing an ASP session between the first device and the second device based on the response; and determining a second connection topology between the first device and the second device based on the role change.

5. The method of claim 4, wherein the request comprises a service role which is to be evented out by the second ASP of the second device to wireless serial bus (WSB) service of the second device and the service role is further defined by the second connection topology.

6. A method for providing dual role handling between at least two devices in a wireless communication, the method comprising:
    identifying a first device with a first connection topology;
    establishing, by the first device, a connection with a second device having the first connection topology;
    sending a first request by a first application service platform (ASP) of the first device, to the second device over the connection, wherein the request is a provision discovery (PD) request;
    receiving a first response from a second ASP of the second device over the connection, wherein the first response includes a deferred status indicating a second request or a second response;
    receiving, by the first ASP, the second request which includes a service role, from the second ASP over the connection;
    sending, by the first ASP, the second response which confirms the service role, to the second ASP over the connection;
    establishing an ASP session between the first device and the second device; and
    establishing a second connection topology between the first device and the second device based on the second response,
    wherein the first request and the second request are PD requests and the first response and the second response are PD responses.

7. The method of claim 6, wherein the second request comprises the service role which is to be evented out by an ASP of the first device to wireless serial bus (WSB) service of the first device and the service role is further defined by the second connection topology.

8. A system for providing dual role handling between at least two devices in a wireless communication, the system comprising:
    a transceiver; and
    at least one processor coupled to the transceiver, the at least one processor configured to:
        seek, by a first device, at least one device with a first connection topology, wherein the first device is a host device;
        establish a connection with a second device having the first connection topology, wherein the second device is a client device;
        establish an application service platform (ASP) session with the second device once the connection is established between the first device and the second device;
        send, by the first device, a first role negotiation message comprising a request for role change to the second device based on the ASP session, wherein the first role negotiation message corresponds to a user-defined ASP message;
        receive a first message for confirmation based on the ASP session, if the second device accepts the first role change based on the role negotiation message; and
        determining a second connection topology between the first device and the second device based on the first role negotiation message and the first message.

9. The system as claimed in claim 8, wherein the at least one processor is further configured to:
  seek, by the first device, at least one device with a third connection topology, wherein the first device is a client device,
  establish a connection with the second device having the third connection topology, wherein the second device is a host device,
  establish an ASP session with the second device, and
  determine a fourth connection topology between the first device and the second device based on the first role negotiation message and the first message.

10. The system as claimed in claim 9, wherein the at least one processor is further configured to:
  identify the first device with a fifth connection topology,
  establish, by the first device, a connection with another device having the first fifth connection topology,
  establish an ASP session between the first device and the other device, and
  determine a sixth connection topology between the first device and the other device based on completing a second role negotiation comprising a role change between the first device and the other device.

11. The system as claimed in claim 8, wherein the at least one processor is further configured to:
  sending another request for role change by a first ASP of the first device, to the second device over the connection, wherein the other request is a provision discovery (PD) request, and
  receiving another response from a second ASP of the second device over the connection, wherein the other response includes a role defined for the first device wherein the response is a PD response.

12. The system as claimed in claim 11, wherein the other request comprises a service role which is to be evented out by the second ASP of the second device to WSB service of the second device.

13. The system as claimed in claim 8, wherein the at least one processor is further configured to:
  send a first request by a first ASP of the first device, to the second device over the connection,
  receive a first response from a second ASP of the second device over the connection, wherein the response includes deferred status indicating a second request or a second response,
  receive, by the first ASP, the second request from the second ASP, which includes a service role information over the connection, and
  sending, by the first ASP, the second response, to the second ASP of the second device which confirms the service role, over the connection, wherein the first request and the second request are provision discovery (PD) requests and the first response and the second response are PD responses.

14. The system as claimed in claim 13, wherein the second request comprises a service role which is to be evented out by the first ASP of the first device to wireless serial bus (WSB) service of the first device and the service role is further defined by the second connection topology.

* * * * *